United States Patent [19]

Yu

[11] Patent Number: 5,279,460
[45] Date of Patent: Jan. 18, 1994

[54] PRESSURE-COMPENSATED SELF-FLUSHING DRIPPER AND MINI SPRAY

[76] Inventor: Michael Yu, 1270 Shakespeare Dr., Concord, Calif. 94521

[21] Appl. No.: 905,022

[22] Filed: Jun. 26, 1992

[51] Int. Cl.⁵ .................. A01G 25/02; B05B 15/02
[52] U.S. Cl. .......................... 239/1; 239/106; 239/533.13; 239/542; 239/547
[58] Field of Search ............ 239/1, 542, 547, 104, 239/106, 114, 123, 533.1, 533.13, 464, 468

[56] References Cited

U.S. PATENT DOCUMENTS

| | | | |
|---|---|---|---|
| 1,615,010 | 1/1927 | Gerding | 239/468 |
| 3,746,263 | 7/1973 | Reeder et al. | 239/542 |
| 3,762,651 | 10/1973 | Condolios | 239/542 |
| 3,841,349 | 10/1974 | Todd | 239/542 |
| 3,873,031 | 3/1975 | Reeder et al. | 239/542 |
| 4,100,940 | 7/1978 | Spears | 239/542 |
| 4,173,308 | 11/1979 | Savvides | 239/464 |
| 4,687,143 | 8/1987 | Gorney et al. | 239/542 |
| 4,726,527 | 2/1988 | Mendenhall | 239/542 |

FOREIGN PATENT DOCUMENTS

| | | | |
|---|---|---|---|
| 2607658 | 6/1988 | France | 239/542 |
| 269540 | 11/1929 | Italy | 239/468 |

Primary Examiner—Karen B. Merritt
Attorney, Agent, or Firm—Baker & Botts

[57] ABSTRACT

The dripper and mini-spray include an inlet and an outlet coupled to a housing which defines a substantially spherical or ellipsoidal chamber. The chamber houses a ball which can roll about the chamber freely, but which is too large to exit through either the inlet or outlet. The outlet includes a cradle which is formed with ridges and/or slots. The inlet of the dripper is horizontally attached to an irrigation line and with water pressure in the line the ball is forced against the cradle, effectively closing off the outlet, however some water is able to escape via openings formed by the ridges/slots. At the beginning of each irrigation cycle a small whirlpool is created in the chamber, pushing the ball about, which flushes out any debris which has accumulated in the chamber.

11 Claims, 2 Drawing Sheets

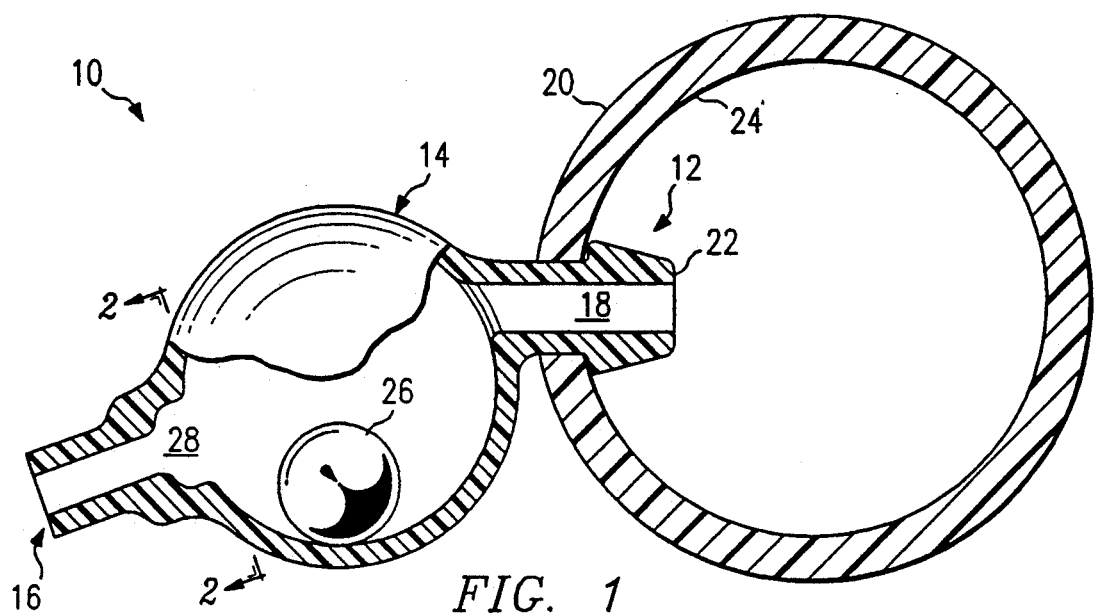
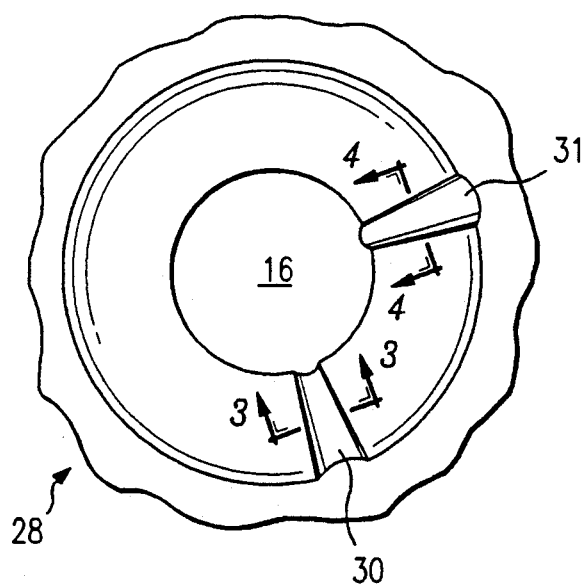
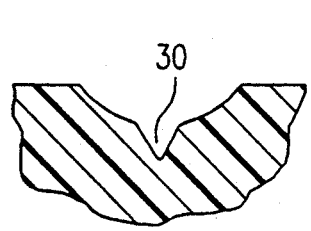 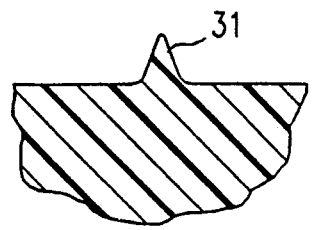

PRESSURE-COMPENSATED SELF-FLUSHING DRIPPER AND MINI SPRAY

TECHNICAL FIELD OF THE INVENTION

This invention relates in general to the field of irrigation systems. More particularly, the present invention relates to a pressure-compensated self-flushing dripper and mini-spray.

BACKGROUND OF THE INVENTION

In the field of irrigation systems, the drip system has become one of the most widely used water delivery method. The drip system is advantageous over other irrigation methods mainly because it delivers water and/or fertilizer only to those spots where it is needed. Not only is water consumption decreased, but the crop benefits for a number of reasons. Incidents of mildew and other undesirable fungus are minimized since the water is only delivered to the feeder roots of each plant. Weeds in the field are also discouraged because surface soil is mostly dry. The drip system is especially preferred when the planting field is not level, such as a hillside.

In conventional drip systems, water is carried in drip hoses generally along rows of plantings. At the location of each plant, a dripper or drip head is inserted into the hose to form a conduit. The generally hollow dripper thus allows water to flow into the dripper and dispense the water one drop at a time. However, due to the relatively small size of the dripper, its water delivery passage and openings are prone to obstruction by sand, soil, debris, algae and bacterial matter that have accumulated in the system. The farm or orchard operator must therefore examine each dripper frequently to ensure each is functioning properly. If a plugged dripper is found, it must be removed from the hose to be cleaned or replaced. It is obvious that this is an extremely time-consuming process since a typical farming operation or orchard may employ thousands of such drippers in its irrigation system.

The restoration process is also not without complications. The intake passage of a conventional dripper is equipped with an annular barb that effectively anchors against the inside wall of the hose when the intake passage and annular barb is pierced and inserted into the hose. The removal therefore requires pulling out the dripper by force which also enlarges the size of the drip hole and weakening the structure. The reinserted dripper thus has a weakened area to anchor against. If the farm or orchard operator had chosen not to turn the water off before undertaking this task, the water gushing out of the dripper hole makes it even more difficult to return the dripper to the hole. It is also easy to see that repeated insertion and removal of a dripper will eventually enlarge the hole and weaken the surrounding area to such an extent that it will not hold the dripper effectively. The water pressure in the hose may eventually force the dripper out of the enlarged hole.

In addition, where the soil is sandy, it is desirable to wet a larger area of the soil so that the feeder root system has access to an ample supply of water. A conventional drip head is not able to deliver water in such a manner.

Accordingly, it is desirable to employ a dripper and a mini-spray in an irrigation system that effectively maintains an unobstructed passageway. More particularly, such a dripper should remain unobstructed by soil, sand, algae, bacterial matter and other debris without demanding any change in the operation of the irrigation system. The employment of this improved dripper would greatly enhance the operation of any irrigation system in terms of time and cost.

SUMMARY OF THE INVENTION

In accordance with the present invention, a pressure-compensated self-flushing dripper is provided which substantially eliminates or reduces disadvantages and problems associated with prior drippers.

The dripper includes an inlet and an outlet coupled to a housing defining a substantially spherical chamber. The chamber houses a ball which can roll about the chamber freely, but which is too large to exit through either the inlet or outlet.

BRIEF DESCRIPTION OF THE DRAWINGS

For a better understanding of the present invention, reference may be made to the accompanying drawings, in which:

FIG. 1 is a fragmentary elevational view of a preferred embodiment of the dripper;

FIG. 2 is a cross-sectional view of a preferred feature in the present invention taken along line 2—2 in FIG. 1;

FIG. 3 is a cross-sectional view of the preferred feature taken along line 3—3 in FIG. 2;

FIG. 4 is a cross-sectional view of an alternative embodiment taken along line 4—4 in FIG. 2;

DETAILED DESCRIPTION OF THE INVENTION

Figure 5:
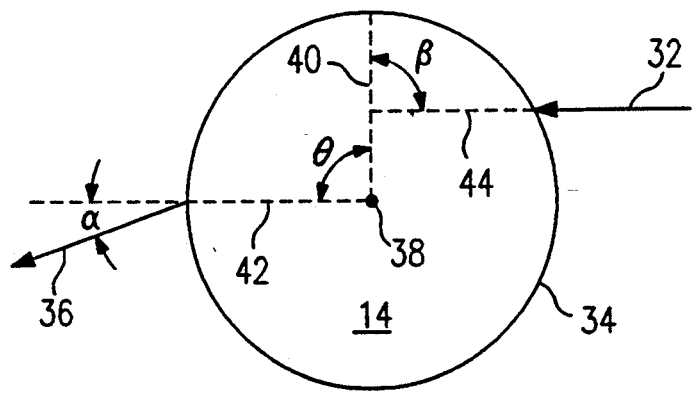
FIG. 5 is a schematic illustrating the preferred placement and orientation of dripper components.

With reference to the drawings, FIG. 1 illustrates a preferred embodiment of a pressure-compensated self-flushing dripper, indicated generally at 10 and constructed according to the teaching of the present invention. Dripper 10 is generally used in a drip irrigation system in conjunction with an array of irrigation hoses to deliver water to each individual plant in a farm or tree in an orchard.

Dripper 10 is generally constructed of three main constituents: an inlet 12, a dripper housing 14, and an outlet 16. Inlet 12 defines a narrow passageway 18 that receives water or other liquids retained in an irrigation hose or piping 20. Inlet 12 includes an annular barb structure 22 which effectively anchors against an inner wall 24 of irrigation hose 20. The inlet 12 is inserted generally horizontally into the irrigation hose 20 with passageway 18 lying generally horizontally and at a right angle to irrigation hose 20. Inlet 12 is coupled to dripper housing 14 so that passageway 18 leads directly into a space defined by dripper housing 14. The manner in which inlet 12 is coupled to housing 14 is described in more detail below in conjunction with FIG. 5.

Dripper housing 14 generally defines a spherical or ellipsoidal chamber and houses a generally spherical dripper ball 26. The housing outer wall may also be spherical or ellipsoidal in shape. Dripper ball 26 is free to roll about inside dripper housing 14 and is too large to exit through either inlet 12 or outlet 16. Dripper ball 26 is preferably constructed of synthetic elastomer materials such as EPDM (amethylene propylene polymer) or polyurothm. In general, factors important for determining the material are, in no particular order, durability, flexibility, hardness, specific gravity, and slickness. The inside wall of dripper housing 14 is substantially smooth and free of obstructions to the movements of dripper ball 26.

Outlet 16 is coupled to dripper housing 14 generally on an opposed site from inlet 12. Outlet 16 defines another narrow passageway through which water may flow. An additional cradle-like feature 28 is defined where outlet 16 meets dripper housing 14. In general, the ratio between cradle opening diameter and dripper ball diameter is preferably between 1:1.4 to 1:1.6. It is preferable that cradle 28 is constructed such that a relatively small area comes into contact with ball 26 when it rests against cradle 28. This is achievable when cradle 28 has a generally sharp lip rather than a gradually sloping lip, as seen in FIG. 1.

Referring to FIGS. 2 and 3, cradle 28 further includes a slot 30. As shown more clearly in FIG. 3, slot 30 provides a small opening between dripper housing 14 and outlet 16. The function of slot 30 is described in detail below. Cradle 28 may define one or more slots. Alternatively, a generally convex feature may be employed. Referring to FIG. 4, a generally convex protruding ridge 31 is similarly situated on cradle 28. The function of ridge 31 is also described below. A dripper 10 may employ a number of slots 30 or ridges or a combination of both, depending on the desired effects and application.

Referring to FIG. 5, a schematic diagram is provided to illustrate the placement and orientation of inlet 12 and outlet 16 with respect to dripper housing 14. An arrow 32 depicts a centerline of inlet 12, a circle 34 depicts the general outline of dripper housing 14, and arrow 36 depicts a centerline of outlet 16. A center 38 of circle 34 is shown. Two radial lines 40 and 42 are shown to aid in locating the position and orientation of inlet 12 and outlet 16. Radial lines 40 and 42 are at an angle $\theta = 90°$ from one another. An imaginary line 44 can be drawn from a midpoint of radial line 40 to the perimeter of circle 34; line 44 being at an angle $\beta = 90°$ to radial line 40. Therefore line 44 in effect is perpendicular to radial line 40 and bisects it. Center line 32 of inlet 12 is an extension of line 44 beyond the perimeter. Center line 36 of outlet 16 extends from where radial line 42 intersects the perimeter at an angle $\alpha$ from radial line 42. Angle $\alpha$ is preferably an acute angle, as shown in FIG. 5, and centerline 36 lies in the same plane as centerline 32. The geometry of dripper 10 as described is important to create the whirlpool inside the spherical chamber during the flush cycle. This function is described in more detail below. While the invention has been described in detail above, dripper 10 may be configured in a different but comparable geometry without departing from the teachings of the invention.

Figure 6:
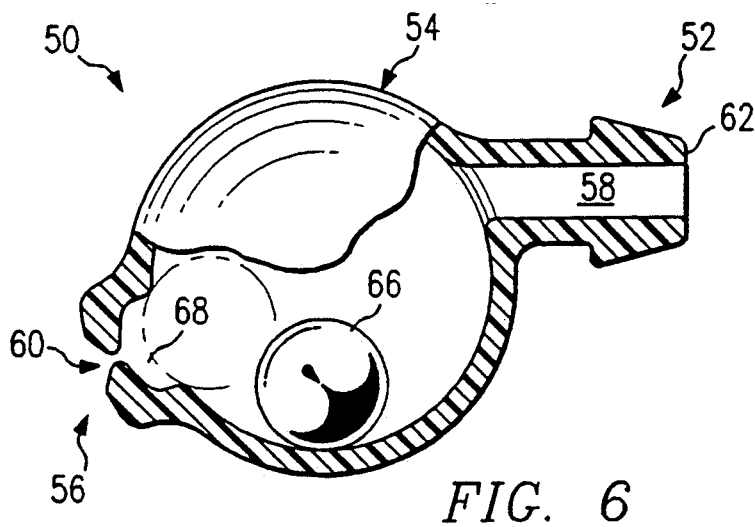
FIG. 6 is a fragmentary elevational view of a preferred embodiment of the mini-spray.

Referring to FIG. 6, a preferred embodiment of mini-spray 50 is shown. Mini-spray 50 includes an inlet 52, a housing 54 and an outlet 56. Inlet 52 defines a narrow passageway 58 which acts to receive water or other liquids. Inlet 52 includes an annular barb construction 62 which acts to anchor against the irrigation hose wall (not shown). The manner in which inlet 52 is coupled to housing 54, the construction and function thereof are identical to that shown in FIG. 5 and in the discussions above related the dripper 10 shown in FIG. 1.

Housing 54 is generally spherical or ellipsoidal and contains a substantially free-roaming ball 66. The construction and function of ball 66 are also identical to that of dripper 10 and will not be repeated herein.

Figure 7:
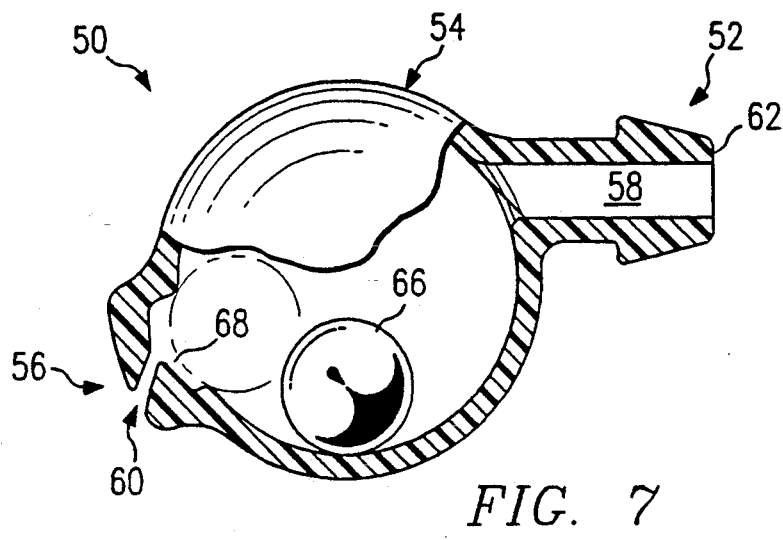
FIG. 7 is a fragmentary elevational view of another preferred embodiment of the mini-spray.

Outlet 56 is coupled to housing 54 generally in a manner similar to that of dripper 10, however, it is of a different structure and serves a different function. Outlet 56 includes a cradle structure 68 similar to that of dripper 10, having one or more slots and/or ridges as shown in FIG. 2 to provide small exit openings from housing 54. However, because of the increased volume in the spray application, the number of slots and/or ridges may be adjusted accordingly. In addition, the dimension of opening 60 of outlet 56 is reduced from that of dripper 10. The reduced opening size causes the water to exit in a spray pattern. As shown in FIG. 7, opening 60 and outlet 56 can be constructed so that the water spray is more advantageously directed toward desired locations.

OPERATION OF THE PREFERRED EMBODIMENT

In operation, dripper 10 is used in farms and orchards employing the drip irrigation method. In this method, irrigation hoses line each row of plants or trees and one or more drippers is used to deliver continuous drops of water to each plant or tree.

Dripper 10 may be attached to a desired location on the hose by first piercing the hose with a sharp object, such as a knife, a power drill, or a special hand tool. Inlet 12 is then pushed into the hole which is then anchored securely by annular barb 22. Dripper 10 may be oriented such that outlet 16 is substantially horizontal, or pointing substantially downward, or points in between.

At the beginning of each irrigation cycle, the water to the irrigation hoses are turned on, which creates a great water pressure in the system. Water fills the hoses and is forced into dripper housing 14 through narrow inlet passageway 18 at an even greater pressure. Due to the substantially spherical or ellipsoidal shape of dripper housing 14 and the orientation of the inlet and outlet, a small whirlpool is created therein, pushing dripper ball 26 about. In a short duration of time, water swirling around in dripper housing 14 effectively flushes out any debris or foreign matter accumulated in dripper housing 14 or the hoses through outlet 16. The flush cycle duration is generally determined by the geometry, orientation and placement of the dripper components 12, 14 and 16 in addition to line pressure and the characteristics of dripper ball 26. Preferably, the flush cycle lasts approximately one second which is sufficient to flush out most or all of the accumulated debris in the system. The flush cycle concludes as dripper ball 26 is forced toward outlet 16 and rests against cradle 28. This action initiates the drip cycle.

The drip cycle is characterized by the formation of drops of water at outlet 16 which drops to the soil to irrigate the plant or tree. Due to the water pressure in the line and dripper housing 14, dripper ball 26 is forced against cradle 28, effectively closing off outlet 16. However, water is able to escape dripper housing 14 through slot 30. The rate of water dripping from outlet 16 may be regulated by varying the line pressure. The higher the water pressure in the lines, the more forceful dripper ball 26 is pushed against cradle 28 and slot 30. Alternatively, dripper ball 26 is forced against ridge 31, which provides small openings on either side thereof.

Thus depending on the flexibility and hardness of dripper ball 26 with respect to dripper housing 14 and/or cradle 30, the amount of water expended may be regulated effectively. This pressure compensation feature ensures an even distribution of water throughout the irrigation system, where water pressure may vary or may be affected by unlevel grounds. In view of the foregoing, it is preferable that dripper ball 26 be constructed of a flexible material, and dripper housing 14 and/or cradle 28 (including ridge 31, if any, thereon) be constructed of a somewhat harder material. Constructed in this manner, as water forces dripper ball 26 against cradle 28, small openings are made by slot 30 and/or ridge 31. Similar functions may be achieved by using a hard ball 26 and a softer cradle 28 and/or cradle 28, or ball 26 and cradle 28 both made of a generally softer material. The materials used may be EPDM, hard plastic and the like.

The specific gravity of dripper ball 26 may be less than or greater than one. At the conclusion of the drip cycle, as both water pressure and level drop in dripper housing 14, dripper ball 26 will tend to float upward from cradle 28 toward the water surface or drop toward the bottom of dripper housing 14, depending on its relative specific gravity. In this manner, outlet 16 is once again unobstructed and able to discharge water. The water discharged at this time serves to perform additional flushing.

It is evident that the need to flush out the system is the greatest at the beginning of each irrigation cycle, because debris and foreign matter are generally accumulated when there is no water in the system. In the unlikely event that dripper 10 still becomes plugged, all that is required to restore it to working order is to free dripper ball 26 by inserting a blunt pointed pin into outlet 16. Accordingly, the self-flushing feature substantially eliminated disadvantages associated with prior drippers.

The spray application of dripper 10 or mini-spray 50 is operated in a similar manner. Since the discharge pressure is reduced and regulated as compared with the line pressure after the water has passed through openings in the cradle, the outlet opening is larger in size than conventional water spray heads, thus facilitating the flushing of larger debris from the system. Water droplets thus formed by mini-spray 50 are larger than those formed by conventional spray heads, which allows the water droplets to reach the soil rather than to be carried away by wind or evaporate. The spray application is especially beneficial in sandy soil conditions by producing a larger wet area around the plant and thus allowing more moisture to reach the feeder roots thereof.

Although the present invention has been described in detail, it should be understood that various changes, substitutions and alterations can be made thereto without departing from the spirit and scope of the present invention as defined by the appended claims.

What is claimed is:

1. An irrigation dripper comprising:
   an inlet for insertion substantially horizontally into an irrigation line and defining a passageway having a centerline lying substantially horizontally and at a right angle from said irrigation line;
   a housing defining a generally spherical chamber having a center point, said inlet passageway leading into said chamber and said inlet passageway centerline being substantially offset from said center point of said spherical chamber;
   an outlet defining a passageway leading from said chamber, said outlet passageway having a centerline disposed at an angle from said inlet passageway centerline, and said outlet passageway centerline lying in a same plane as said inlet passageway centerline; and
   a ball being free to roll about said chamber of said housing and adapted for substantially obstructing said outlet passageway.

2. The dripper, as set forth in claim 1, further comprising a cradle coupling said outlet passageway to said chamber.

3. The dripper, as set forth in claim 2, wherein said cradle defines at least one slot thereon, adapted for forming a substantially narrow passageway therethrough as said ball is substantially obstructing said outlet passageway.

4. The dripper, as set forth in claim 2, wherein said cradle comprises at least one ridge thereon, adapted for forming substantially narrow passageways around said at least one ridge as said ball is substantially obstructing said outlet passageway.

5. The dripper, as set forth in claim 2, wherein said cradle defines a plurality of slots arranged in a predefined pattern and adapted for forming narrow passageways from said spherical chamber to said outlet.

6. The dripper, as set forth in claim 2, wherein said cradle defines a plurality of ridges arranged in a predefined pattern and adapted for forming narrow passageways from said spherical chamber to said outlet.

7. The dripper, as set forth in claim 1, wherein said inlet further comprises a barb construction for anchoring in said irrigation line.

8. The dripper, as set forth in claim 1, wherein said outlet passageway is substantially narrower than that of said inlet passageway and adapted for producing a spray pattern.

9. A dripper for use in a drip irrigation system, the dripper comprising:
   an inlet defining a passageway and adapted for insertion into an irrigation line, said inlet passageway having a centerline;
   a housing defining a generally spherical chamber and being coupled to said inlet passageway, said inlet passageway centerline being non-radial with respect to said spherical chamber;
   an outlet defining a passageway coupled to said chamber;
   first and second radial lines lying on a horizontal plane and extending from a center point of said chamber to first and second points on a perimeter defined on said chamber, said two lines being generally 90° apart, said centerline of said inlet passageway extending generally perpendicularly with respect to the first radial line and generally bisecting it, a centerline of said outlet passageway extending generally from where the second radial line intersects the perimeter, and extending generally therefrom at an acute angle from the second radial line; and
   a substantially flexible ball being free to roll about said chamber of said housing and adapted for substantially obstructing said outlet passageway.

10. The dripper, as set forth in claim 9, wherein the inlet and outlet passageway centerlines lie in the same plane as that of the first and second radial lines.

11. A method for drip irrigation using a generally spherical dripper chamber, the method comprising the steps of:

horizontally introducing an irrigation fluid into the generally spherical dripper chamber, the angle of fluid introduction being substantially tangential, the fluid entering the chamber at a mid point on a radial line emanating from a center point of the generally spherical chamber, the radial line being perpendicular to the angle of fluid introduction;

creating a whirlpool inside the generally spherical dripper chamber, and swirling a ball disposed inside the chamber around therein for a predetermined amount of time;

flushing debris from the generally spherical dripper chamber and causing the irrigation fluid and debris to exit the chamber through an outlet disposed generally opposed from where said irrigation fluid was introduced;

pushing the ball against the outlet and substantially obstructing the outlet; and permitting a predetermined amount of irrigation fluid to exit the chamber through the outlet at a predetermined rate.

* * * * *